United States Patent
Cummings

(10) Patent No.: US 9,766,087 B2
(45) Date of Patent: Sep. 19, 2017

(54) WIRELESS CLIENT-SERVER NAVIGATOR TRAFFIC METHODS

(76) Inventor: Ian Cummings, Ypsilanti, MI (US)

(*) Notice: Subject to any disclaimer, the term of this patent is extended or adjusted under 35 U.S.C. 154(b) by 1673 days.

(21) Appl. No.: 12/114,195

(22) Filed: May 2, 2008

(65) Prior Publication Data
US 2008/0275641 A1 Nov. 6, 2008

Related U.S. Application Data

(60) Provisional application No. 60/916,142, filed on May 4, 2007, provisional application No. 60/916,681, filed on May 8, 2007.

(51) Int. Cl.
*G01C 21/00* (2006.01)
*G01C 21/34* (2006.01)
*G08G 1/0968* (2006.01)

(52) U.S. Cl.
CPC ... *G01C 21/3492* (2013.01); *G08G 1/096844* (2013.01)

(58) Field of Classification Search
USPC ....... 701/200, 204, 209, 210, 117, 118, 119; 340/995.21, 907, 910, 917, 919, 995.13; 345/824
See application file for complete search history.

(56) References Cited

U.S. PATENT DOCUMENTS

| | | |
|---|---|---|
| 5,172,321 A | 12/1992 | Ghaem et al. |
| 5,543,789 A | 8/1996 | Behr et al. |
| 5,610,821 A * | 3/1997 | Gazis et al. ............... 455/456.5 |
| 5,652,706 A | 7/1997 | Morimoto et al. |
| 5,659,476 A | 8/1997 | LeFebvre et al. |
| 5,818,356 A * | 10/1998 | Schuessler ............... 340/995.12 |

(Continued)

OTHER PUBLICATIONS

Traffic GPS Review, www.gpsreview.net/traffic Website Printout, Date of creation unknown.

(Continued)

*Primary Examiner* — Khoi Tran
*Assistant Examiner* — Jorge Peche
(74) *Attorney, Agent, or Firm* — John G. Posa; Belzer PC

(57) ABSTRACT

A wireless client-server (WCS) navigator provides routes optimized for travel time based on traffic flow rate and incident data, inexpensively and in a timely manner. A server, having a database of geographical information including road segments at a server, receives information representing traffic flow rates or traffic incidents along the road segments. This allows a route to be generated that is optimized to minimize travel time along the road segments based upon the traffic flow rates or traffic incidents. The route is then transmitted to a mobile client. Typically, though not necessarily, the route is generated in response to a request from a mobile client. Some travel time estimates may be based on historical traffic flow rate data or speed limit data rather than current information. Traffic flow rate or traffic incident data associated with the transmitted route may be transmitted to a client along with the route. The traffic flow rate information may be used to create estimates of time of arrival at a destination or points along the route. The points along the route may include, for example, points at which a maneuver such as a turn should be performed in conjunction with the route.

2 Claims, 1 Drawing Sheet

(56) References Cited

U.S. PATENT DOCUMENTS

| | | | |
|---|---|---|---|
| 6,038,509 A | 3/2000 | Poppen et al. | |
| 6,038,559 A | 3/2000 | Ashby et al. | |
| 6,064,941 A | 5/2000 | Nimura et al. | |
| 6,107,944 A | 8/2000 | Behr et al. | |
| 6,216,086 B1* | 4/2001 | Seymour et al. | 701/533 |
| 6,233,518 B1* | 5/2001 | Lee | 701/117 |
| 6,324,472 B1 | 11/2001 | O'Shea | |
| 6,347,278 B2* | 2/2002 | Ito | 701/411 |
| 6,381,535 B1 | 4/2002 | Durocher et al. | |
| 6,487,494 B2* | 11/2002 | Odinak et al. | 701/420 |
| 6,845,322 B1 | 1/2005 | Chao et al. | |
| 6,853,915 B2* | 2/2005 | Hubschneider et al. | 701/420 |
| 7,099,773 B2* | 8/2006 | Linn | 701/414 |
| 7,440,842 B1* | 10/2008 | Vorona | 701/117 |
| 7,526,377 B2* | 4/2009 | Wiener et al. | 701/414 |
| 2001/0029425 A1* | 10/2001 | Myr | 701/200 |
| 2003/0014187 A1* | 1/2003 | Chun et al. | 701/209 |
| 2003/0083812 A1* | 5/2003 | Watanabe et al. | 701/209 |
| 2004/0104842 A1* | 6/2004 | Drury et al. | 342/357.13 |
| 2005/0038596 A1* | 2/2005 | Yang et al. | 701/200 |
| 2005/0102102 A1* | 5/2005 | Linn | 701/210 |
| 2005/0251324 A1* | 11/2005 | Wiener et al. | 701/200 |
| 2008/0004791 A1* | 1/2008 | Sera | 701/117 |

OTHER PUBLICATIONS

Understanding GPS Navigation Traffic Services, http://news.consumerreports.org/cars/2007/12/gps-traffic.html Website Printout, Date of creation unknown.

AirSage Real-Time Traffic (ART) Website Printout, Date of creation unknown.

* cited by examiner

WIRELESS CLIENT-SERVER NAVIGATOR TRAFFIC METHODS

REFERENCE TO RELATED APPLICATIONS

This application claims priority from U.S. Provisional Patent Application Ser. No. 60/916,142, filed May 4, 2007 and 60/916,681, filed May 8, 2007, the entire content of both being incorporated herein by reference.

FIELD OF THE INVENTION

This invention relates generally to navigation systems, and in particular to the use of traffic data to optimize routing.

BACKGROUND OF THE INVENTION

Vehicle navigation systems now provide guidance that optimizes routes as a function of travel distance. While options are sometimes given to optimize routes for travel time instead, these are generally primitive approximations based on speed limits or historical travel time data. And while a variety of traffic data sources are available, transferring the data to mobile navigation devices in a useful manner is difficult. To generate optimized routes, recent traffic flow rate data about all possible roads considered by the navigator must be available, which necessitate that transfer of large amount of data to mobile navigation devices. Traffic flow rate data can change quickly, and data that is even a few minutes out of date can cause suboptimal routes to be generated. Thus data must be transmitted frequently to keep device databases up to date.

Several approaches have been tried to optimize navigator routing for traffic information, but all have significant drawbacks. One approach taken is to transmit information via FM TMC (Traffic Message Channel through frequency modulated radio broadcasts). While this approach is inexpensive, data transmission is slow. As a result only limited information about traffic jams and traffic incidents is transmitted rather than traffic flow rate data.

Another current approach is to transmit traffic information via a wireless modem. This approach is expensive because wireless carriers must be paid for the transmission. As a result, transmitted information is often limited to information about traffic jams and traffic incidents rather than traffic flow rate data. If traffic flow rate data were to be transmitted, a significant delay would result due to the volume of data required, which is undesirable in a navigation system.

SUMMARY OF THE INVENTION

This invention uses a wireless client-server (WCS) navigator to provide routes optimized for travel time based on traffic flow rate and incident data, inexpensively and in a timely manner. A server, having a database of geographical information including road segments at a server, receives information representing traffic flow rates or traffic incidents along the road segments. This allows a route to be generated that is optimized to minimize travel time along the road segments based upon the traffic flow rates or traffic incidents. The route is then transmitted to a mobile client. Typically, though not necessarily, the route is generated in response to a request from a mobile client.

Some travel time estimates may be based on historical traffic flow rate data or speed limit data rather than current information. Traffic flow rate or traffic incident data associated with the transmitted route may be transmitted to a client along with the route.

The traffic flow rate information may be used to create estimates of time of arrival at a destination or points along the route. The points along the route may include, for example, points at which a maneuver such as a turn should be preformed in conjunction with the route. A notification may be provided in advance of the maneuver, with the timing of the notification being based upon the estimates of time of arrival at a destination or points along the route. Along with the notification, an estimate may be presented as to the time or distance before the maneuver is to be performed.

In the event that traffic flow rate data or traffic incident data arrives at the server after a route has been provided to a client, the server may recalculate a time-optimized route based on previous and new traffic flow rate data and/or traffic incident data. If the newly calculated route differs from the route previously sent to a mobile client, a newly calculated route may be sent to the client.

A method of notifying a user of a vehicle navigation system that a maneuver should be performed, comprising the steps of estimating the time of arrival to the location of the maneuver based upon speed and distance to the location, and notifying the user as a function of the estimate. The method of claim 10, wherein the maneuver is a turn of the user's vehicle.

DETAILED DESCRIPTION OF TEE INVENTION

A wireless client-server navigator can be described as a system to aid a user in navigating by providing guidance made up of maps, routes, and/or instructions, and
1) which has mobile clients used for requesting and receiving guidance,
2) which has a central server that houses databases of geographical information, and generates guidance, and
3) in which data is transmitted between the mobile clients and central server.

The advantage of WCS navigators in generating time-optimized routes over self-contained navigators is that far less data must be transmitted. In a self-contained navigator, routing is performed on the mobile device, thus traffic flow rate information about all roads that might be used in a route must be transmitted. If the data is to be available on a timely basis, the data must be transmitted frequently. On the other hand, in a WCS navigator, while the same traffic flow rate data is used that would be used in a self-contained navigator, only the final route need be transmitted to the mobile device. This approach reduces the cost of transmitted data for the navigator and also reduces response time, since complete traffic flow rate data for an area takes a significant amount of time to transmit.

Figure 1:
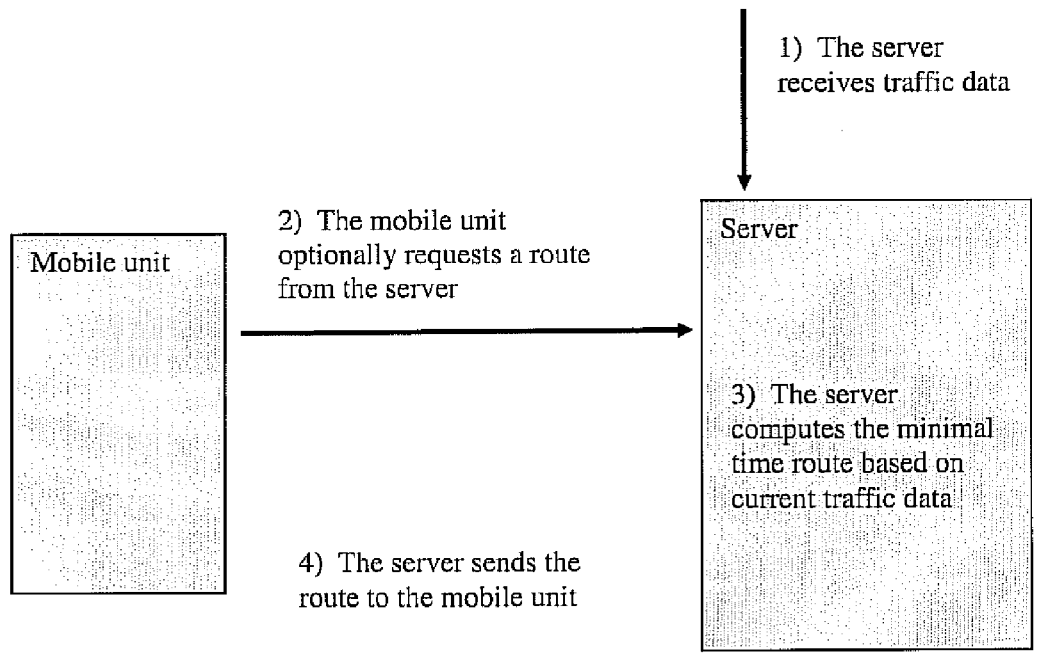
FIG. 1 illustrates the method of using a WCS navigation system to optimize routed based on traffic flow rate data.

Referring to FIG. 1, the server preferably receives traffic flow rate and/or incident information on a continual basis. From this information the server creates travel time estimates for the various road segments in its map database. In the absence of current traffic flow rate information, historical data or speed limit data may be used.

As an optional second step, a request for a route is entered at the client device and transmitted to the server, which receives the request.

The server generates a route from a starting point to a destination along the road segments in its map database. This route is optimized to minimize estimated travel time according to the travel time estimates previously generated.

The route is then transmitted to the mobile client. If the server receives new information indicating that a previously transmitted route is no longer optimal, it may, with or without further input from a user, transmit a route time-optimized for current conditions to the client.

Traffic flow rate information for the road segments in the route may also be transmitted. These data can be used to generate travel time estimates at the client both for the total remaining route to be traveled and for time to arrive at locations where the route specifies a maneuver.

Estimates of travel time to a maneuver allow the navigator to optimize the time at which guidance is provided to a user regarding the maneuver. If a user is informed too early of a maneuver he may not be paying attention at the time the maneuver is to be preformed. If he is informed too late, he may not have time to execute the maneuver. Thus estimating the travel time to an anticipated maneuver allows providing superior guidance as compared to guidance provided when the navigator is a particular distance from the location of the anticipated maneuver.

Figure 2:
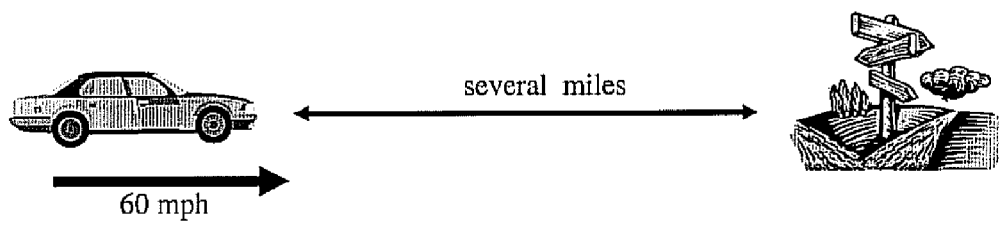
FIG. 2 illustrates using time-to-arrival estimates to optimize the time at which guidance is provided.

As shown in FIG. 2, an automobile is following a route and must make a left turn. The navigator is programmed to give the driver a first notification of a turn 30 seconds before the estimated time of arrival (ETA) at the turn. The navigator makes a running estimate of the estimated of arrival at the turn, and when the ETA drops below 30 seconds, the driver is notified.

I claim:

1. A method of generating a route with a wireless client-server navigator, comprising the steps of:
   providing a database of geographical information including road segments at a server;
   receiving information on a continuous basis at the server representing traffic flow rates or traffic incidents along the road segments;
   generating a route optimized to minimize travel time along the road segments based upon the traffic flow rates or traffic incidents;
   transmitting the route to a mobile client; and
   wherein traffic flow rate or traffic incident data associated with the transmitted route is transmitted to a client along with the route.

2. A method of generating a route with a wireless client-server navigator, comprising the steps of:
   providing a database of geographical information including road segments at a server;
   receiving information on a continuous basis at the server representing traffic flow rates or traffic incidents along the road segments;
   generating a route optimized to minimize travel time along the road segments based upon the traffic flow rates or traffic incidents;
   transmitting the route to a mobile client; and
   wherein: when traffic flow rate data or traffic incident data arrives at the server after a route has been provided to a client;
   the server recalculates a time-optimized route based on previous and new traffic flow rate data and/or traffic incident data; and
   if the newly calculated route differs from the route previously sent to a mobile client, a newly calculated route is sent to the client.

* * * * *